United States Patent [19]

Sherwood et al.

[11] Patent Number: 4,946,060
[45] Date of Patent: Aug. 7, 1990

[54] SEAL ASSEMBLY FOR VEHICLE FILLER NECK

[75] Inventors: Carl H. Sherwood, Brockport; Karen M. Meyer, Webster; Charles H. Covert, Manchester; Gregory P. Weilnau, Churchville, all of N.Y.

[73] Assignee: General Motors Corporation, Detroit, Mich.

[21] Appl. No.: 388,099

[22] Filed: Jul. 31, 1989

[51] Int. Cl.⁵ .............................................. B65D 90/28
[52] U.S. Cl. ................................. 220/86.2; 141/286; 220/85 VS
[58] Field of Search .......... 220/85 F, 85 VR, 85 VS, 220/86 R; 141/285, 286; 280/834, 832

[56] References Cited

U.S. PATENT DOCUMENTS

| | | | |
|---|---|---|---|
| 4,610,284 | 9/1986 | Bartholomew | 141/302 |
| 4,630,749 | 12/1986 | Armstrong et al. | 220/86 |
| 4,651,889 | 3/1987 | Uranishi et al. | 220/85 |
| 4,702,386 | 10/1987 | Boehmer et al. | 220/86 |
| 4,747,508 | 5/1988 | Sherwood | 220/86 R |
| 4,770,677 | 9/1988 | Harris | 220/85 V R |
| 4,809,863 | 3/1989 | Woodcock et al. | 220/85 F |
| 4,816,045 | 3/1989 | Szlaga et al. | 220/85 V R |
| 4,883,103 | 11/1989 | Szlaga et al. | 220/86 R |

Primary Examiner—Jimmy G. Foster
Attorney, Agent, or Firm—Patrick M. Griffin

[57] ABSTRACT

A seal assembly for a vehicle fuel tank filler neck includes a seal lip bordered by a seal casing rim on one side, and a shelf of the filler neck on the other, so as to protect the seal lip against side loading from the nozzle that it seals against.

1 Claim, 2 Drawing Sheets

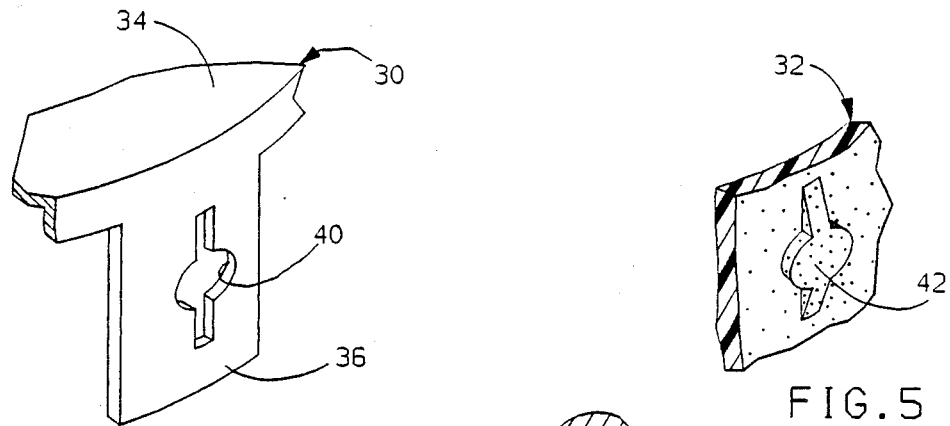
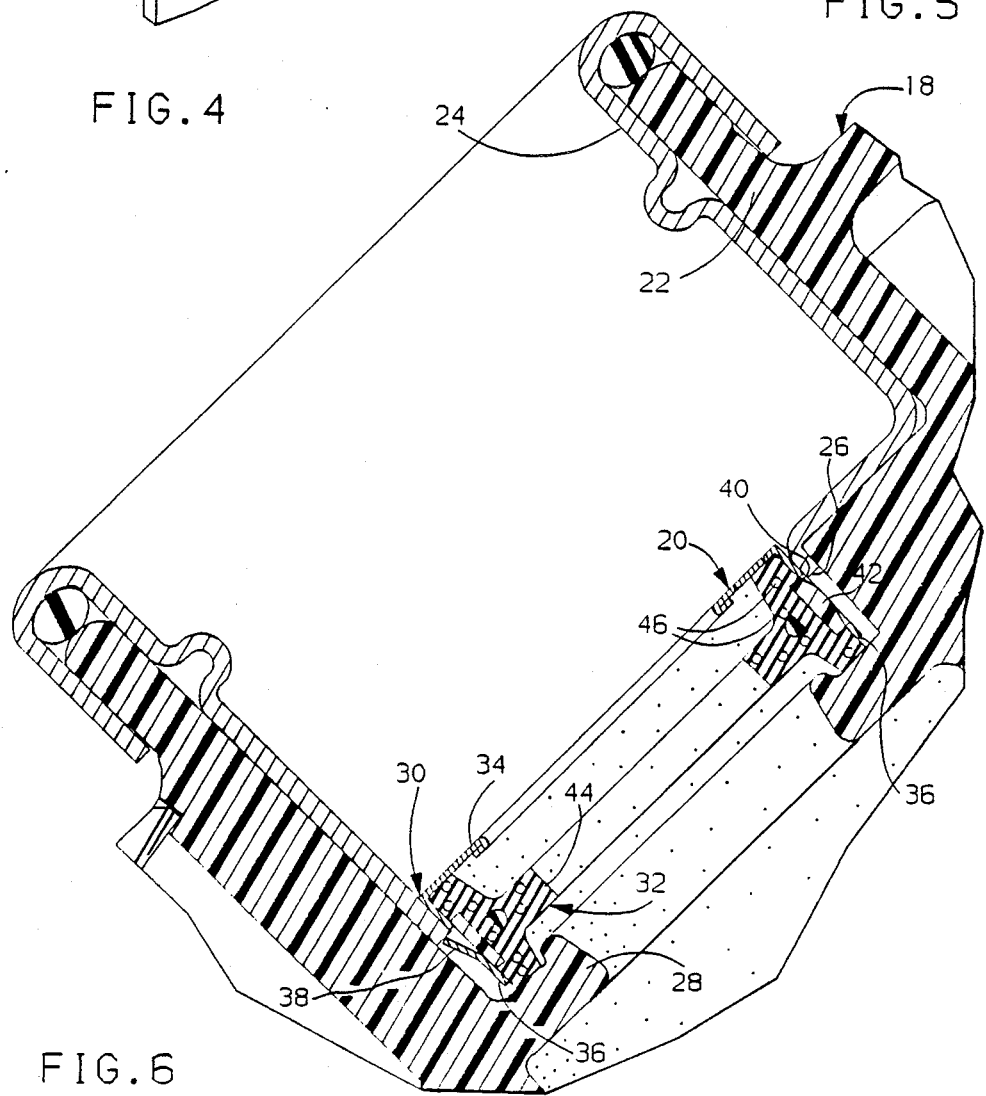

4,946,060

SEAL ASSEMBLY FOR VEHICLE FILLER NECK

This invention relates to vehicle fuel system filler necks in general, and specifically to a seal assembly for a filler neck that prevents the escape of fuel vapors around the nozzle.

BACKGROUND OF THE INVENTION

Vehicle fuel systems that include a fuel fill vapor recovery system often have an encircling seal in the filler neck that engages the inserted fuel nozzle to block the exit of fuel fill vapors. Vapors can then be recovered through a tank vapor vent line and sent to a canister. The effectiveness of vapor recovery depends on the effectiveness of the seal, since any vapors escaping past it cannot be recovered. If the seal interference is made tight, the seal is subject to wear just from the repeated axial insertion and withdrawal of the nozzle. More of a problem is the high side loading the nozzle is subjected to, both from the weight of the nozzle when it is allowed to hang free in the filler neck, or from the weight of an operator leaning on it. Such side forces can open the seal, as well as wear it more quickly over time.

SUMMARY OF THE INVENTION

The invention provides a specially designed filler neck assembly and seal assembly for it that seals the nozzle, but is less subject to wear, and easier to replace.

In the preferred embodiment disclosed, the filler neck assembly is integrally molded as a hard, wear resistant plastic shell that is plugged as a unit into the top of the filler pipe. The unit is molded with a generally cylindrical side wall, which holds a gas cap, and a generally annular shelf extending radially inwardly from the side wall below the open top end. The diameter of the side wall is large enough to receive the nozzle freely, while the shelf has a diameter just slightly larger than the nozzle.

The seal assembly includes a stamped steel casing, and an elastomeric seal member. The casing has an annular upper rim with a diameter similar to the shelf, and a generally cylindrical sleeve depending from the rim. Flexible fingers on the side wall serve as a retention means that allows the casing to be removably secured inside the filler neck side wall. The elastomeric seal member, which is secured to the inside of the casing sleeve, has a circular lip located coaxial to and below the rim, with a diameter slightly smaller than the nozzle. When the casing is installed, the seal lip is located between the casing rim and the shelf, coaxial to both. When the nozzle is inserted, it will pass closely, but with clearance, through both the seal casing rim and the filler neck shelf, and tightly through the seal lip. The exit of fuel vapors from the tiller neck is blocked, and the casIng rim and shelf together protect the seal lip from side loads on the nozzle. If the seal member does wear, it can be removed and replaced. In addition, in the embodiment disclosed, the seal member is molded with an electrically conductive material, and the metal casing is in contact with a grounded metal insert in the filler neck side wall, so that the fuel nozzle may be grounded with assurance.

It is, therefore, an object of the invention to provide a seal assembly for use in a filler neck that protects a seal lip from side loading of the fuel nozzle.

It is another object of the invention to provide a filler neck assembly that cooperates with such a seal assembly to protect the seal lip from side loading.

It is another object of the invention to provide such a filler neck assembly from which the seal assembly may be easily removed and replaced.

It is another object of the invention to provide such a seal assembly that cooperates with the filler neck assembly to provide assured electrical grounding for the fuel nozzle.

DESCRIPTION OF THE PREFERRED EMBODIMENT

These and other objects and features of the invention will appear from the following written description, and from the drawings, in which:

FIG. 4 is a detail of part of the seal casing;

FIG. 5 is a detail of part of the seal member;

FIG. 6 is an enlarged portion of FIG. 1, without the nozzle.

Figure 1:
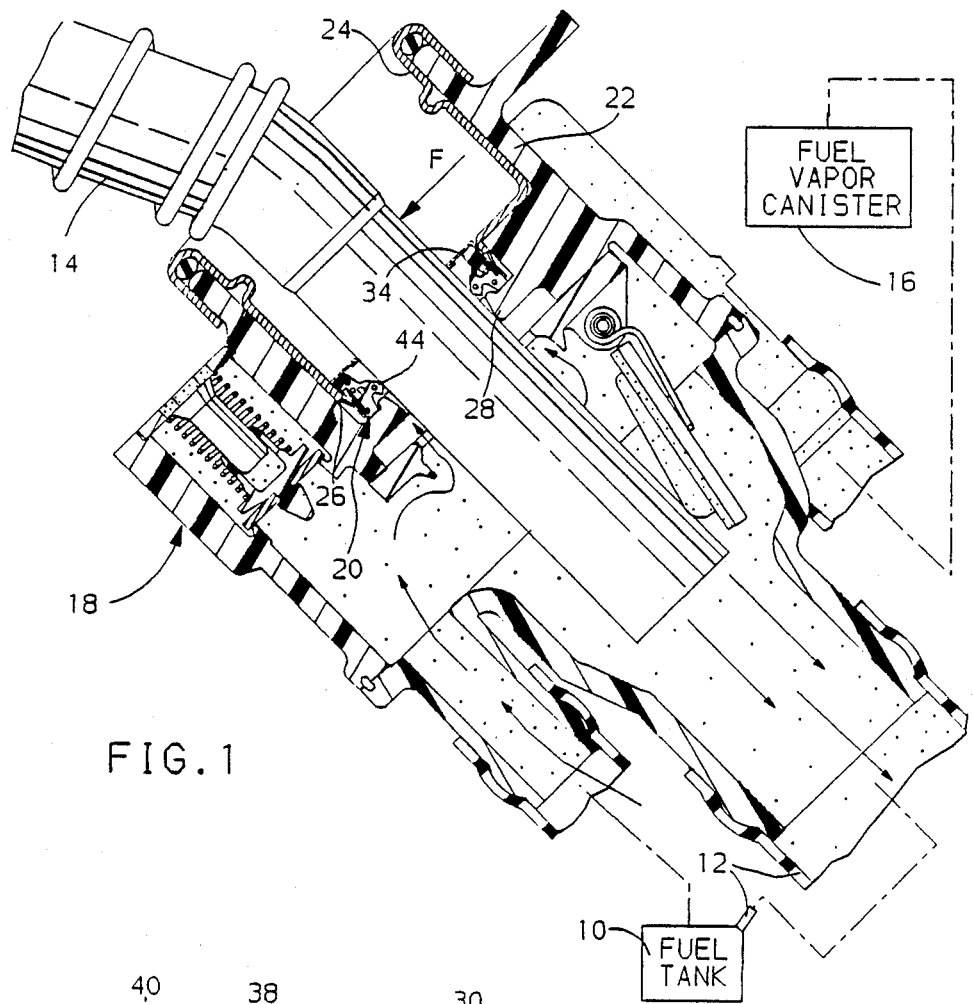
FIG. 1 is a cross sectional view of a preferred embodiment of the invention, showing a fuel nozzle inserted and fuel being added.
Figure 2:
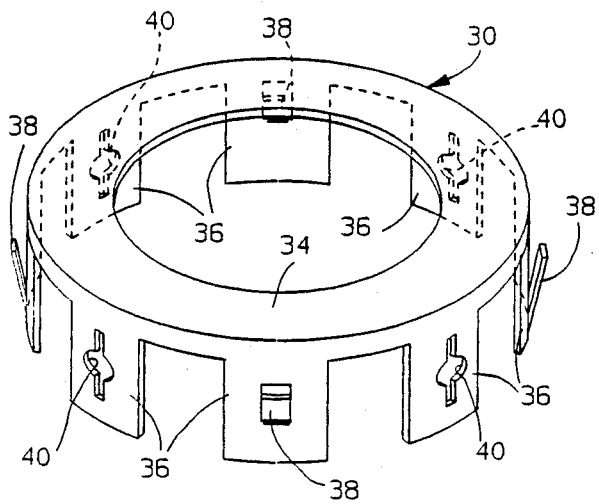
FIG. 2 is a perspective view of the seal casing of the seal assembly.
Figure 3:
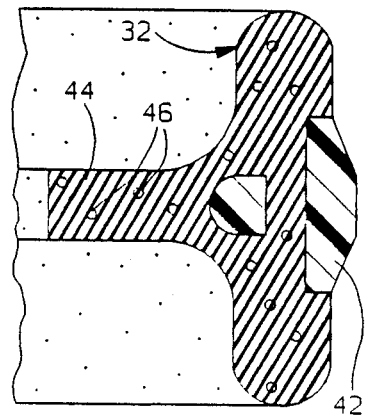
FIG. 3 is an enlarged cross sectional view of the seal member of the seal assembly.

Referring first to FIG. 1, a vehicle fuel system includes a fuel tank 10 with filler pipe 12 that is filled by a conventional fuel nozzle 14. Nozzle 14 is metal and cylindrical in shape, and displaces a significant volume of fuel vapors from tank 10 when it is filled. Nozzle 14 is also subject to significant side loads, as indicated by the arrow marked F, both from its own weight and from operator induced forces. The vapors displaced from tank are routed to a conventional vapors storage canister 16, but must be blocked from reaching atmosphere in order to be recoverable. The invention provides both a filler neck assembly, designated generally at 18, and a seal assembly, indicated generally at 20, that cooperates with the filler neck assembly 18 to block the loss of fuel vapors around nozzle 14 to atmosphere.

Referring next to FIGS. 1 and 6, filler neck assembly 18 is molded of a hard, wear resistant plastic, and has the general shape of a cylindrical shell that can be plugged as a unit into the top of filler pipe 12. A generally cylindrical side wall 22 is large enough to have the nozzle 14 inserted through it with a large degree of clearance. Side wall 22 is lined at its open top end by a threaded metal insert 24, which would be closed by a standard gas cap, not illustrated, and which would be grounded to the body of the vehicle. The insert lower edge 26 is axially spaced from an integrally molded annular shelf 28 that extends radially in from side wall 22. Shelf 28 has an inner diameter just slightly larger than nozzle 14. Filler neck assembly 18 cooperates with seal assembly 20, the details of which are described next.

Referring next to FIGS. 2 through 5, seal assembly 20 includes two components, a seal casing, designated generally at 30, and a seal member, designated generally at 32. Seal casing 30 is stamped of steel, and has a generally L shaped cross section, with an upper annular rim 34 and a cylindrical sleeve depending therefrom comprised of an evenly spaced plurality of eight tabs 36. The inner diameter of rim 34 is just slightly larger than nozzle 14, while the outer diameter of rim 34 is equal to the diameter of the insert lower edge 26. The length of tabs 36 is equal to the axial space between inert lower edge 26 and shelf 28. Four of the tabs 36 have flexible fingers 38 lanced into them, alternating with four that have key hole slots 40. Seal member 32 includes a hard stiffening spine with key hole shaped buttons 42 on its exterior, and a softer, circular elastomeric seal lip 44, with a diameter slightly smaller than nozzle 14. Molded into seal lip 44 is a conductive material, such as graphite or metal powder, indicated at 46. Seal assembly 20 is assembled by pop fitting buttons 42 into matching tab slots 40. Some of the conductive material 46 will be put into contact with the steel tabs 36.

Referring next to FIGS. 1 and 6, seal assembly 20 is then installed in neck assembly 18 by pushing tabs 36 down within metal insert 24 until they abut shelf 28 and the flexible fingers 38 simultaneously click beneath insert lower edge 26. Seal assembly 20 is thereby held solidly in place, with the bottom of seal member 32 sealingly compressed against shelf 28. Lip 44 is bounded by shelf 28 and rim 34, and all three are coaxial. Furthermore, since the tabs 36 are in contact with the insert 24, the conductive seal lip 44 is grounded to the vehicle. When nozzle 14 is inserted, it must pass pass through seal casing rim 34 and and shelf 28 as it passes through seal lip 44. Nozzle 14 makes sealing contact with lip 44, so any fuel fill vapors displaced up filler pipe 12 are blocked from escaping to atmosphere, and may be routed to canister 16. Any side loads on nozzle 14 are cooperatively resisted by rim 34 and shelf 28 together, no matter which way nozzle 14 may be twisted or weighted during fuel fill. Even so, seal lip 44 may wear with time, just from ordinary insertion of nozzle 14. If this occurs, casing 30 can be removed and seal assembly 20 replaced. In addition, even if nozzle 14 is held so that no part of it contacts either metal rim 34 or metal insert 24, it is assured that it will still be grounded by virtue of its contact with the grounded and conductive seal lip 44. Thus, all components of seal assembly 20 and filler neck assembly 18 cooperate to provide protection of seal lip 44, easy replacement of seal assembly 20, and grounding for nozzle 14.

Variations of the preferred embodiment may be made. Even without the shelf 28 in the filler neck assembly 18, the presence of the rim 32 above the seal lip 44 alone would offer a good deal of protection for lip 44 against side loading on the nozzle 14. Thus, a seal assembly like 20 could be used with another filler neck, so long as some means were provided for retaining it in place. The retention means for casing 30 need not be flexible, either, but it is a real advantage if it is, so as to allow for easy replacement. Casing 30 could have a cylindrical sleeve that was continuous, as opposed to the separate tabs 36, but the separate tabs 36 are simpler to form in a stamping. The metal insert 24 and the conductive material 46 in seal lip 44 would not be necessary if assured grounding of nozzle 14 were not necessary, or were otherwise provided for. Metal insert 24 serves very advantageously, however, in that its lower edge 26 serves both as a convenient means to anchor casing 30 against shelf 28 and as assured grounding for seal lip 44 and nozzle 14. Therefore, it will be understood that it is not intended to limit the invention to just the preferred embodiment disclosed.

The embodiments of the invention in which an exclusive property or privilege is claimed are defined as follows:

1. A vehicle filler neck assembly for use with a fuel nozzle that is subject to side loads, a protected seal assembly for sealing around said nozzle, comprising, a hard molded plastic cylindrical side wall with a generally annular, integrally molded shelf extending radially inwardly therefrom through which said nozzle is receivable, a metal insert lining said side wall and having a circular lower edge axially spaced from said shelf, a metal seal casing having an annular upper rim with an inner diameter substantially equal to said shelf and an outer diameter substantially equal to said liner lower edge, said casing also having a generally cylindrical sleeve depending from said rim with an axial length substantially equal to the axial space between said shelf and insert lower edge, flexible retention means on said seal casing sleeve engageable with said insert lower edge when said seal casing sleeve is also engaged with said shelf, and, an elastomeric seal member fixed to said seal casing sleeve, said seal member having a circular seal lip of a diameter slightly smaller than said nozzle located coaxial to and below said seal casing rim, whereby, said seal casing and seal member may be removably installed in said filler neck by pushing said casing sleeve into said insert until said sleeve abuts said shelf and said flexible retention means engage said insert lower edge, after which said nozzle may be inserted through said rim, lip, and shelf, with said seal casing rim and shelf cooperating to shield said lip from nozzle side loads.

* * * * *